United States Patent Office 3,669,616
Patented June 13, 1972

3,669,616
CORROSION INHIBITING COMPOSITIONS AND METHOD
William Bruce Murray, Long Beach, Calif., and Mearl A. Kise, Portsmouth, and Thomas Edward Kelly, Chesapeake, Va., assignors to Virginia Chemicals Inc., Portsmouth, Va.
No Drawing. Continuation-in-part of application Ser. No. 76,221, Sept. 28, 1970. This application Sept. 28, 1971, Ser. No. 184,620
Int. Cl. C23f 11/00
U.S. Cl. 21—2.7
15 Claims

ABSTRACT OF THE DISCLOSURE

Compositions and method for inhibiting corrosion of ferrous and non-ferrous water pipes by inclusion of a zinc compound and a phosphate compound in the water such that the weight ratio of zinc ion to phosphate ion is substantially 1 to 1. Zinc ion concentration is in the range of less than one to about five parts per million.

CROSS REFERENCES TO RELATED APPLICATIONS

This application is related to patent application Ser. No. 829,842, filed May 5, 1959 by William Bruce Murray, entitled Method of Inhibiting Corrosion of a Ferrous Surface, now abandoned, and a continuation-in-part of Ser. No. 76,221, filed Sept. 28, 1970 by William Bruce Murray, entitled Corroision Inhibiting Compositions and Method.

FIELD OF THE INVENTION

The process and composition are each adapted to the treatment of open and closed water systems such as may contain potable or non-potable flows. These objectives are adaptable to protection of ferrous and non-ferrous metals against corrosive waters, including variations between aerated soft meteorological, high total dissolved solids water supplies and/or brackish waters.

DESCRIPTION OF THE PRIOR ART

The known prior art is best represented by Pat. No. 3,284,368 including a zinc and hexametaphosphate corrosion inhibitor. Hexametaphosphate is a source of the metaphosphate ion, which is distinguishable in form and effects from the derived orthophosphate ion in the present system.

Other non-anticipatory art includes the following patents and publications:

| | |
|---|---|
| 2,080,299 | Benning et al. |
| 2,315,995 | Williams. |
| 2,316,810 | Romig. |
| 2,711,391 | Kahler. |
| 2,793,932 | Do. |
| 2,872,281 | Do. |
| 2,900,222 | Do. |
| 3,024,201 | Bregman. |
| 3,116,178 | Upham. |
| 3,120,425 | Hatch. |
| 3,151,087 | Ryznar et al. |
| 3,284,368 | Hatch. |
| 3,347,797 | Kuegemann et al. |
| 3,432,428 | Wirth et al. |
| 3,458,364 | Upham. |
| 3,510,436 | Silverstein et al. |
| 3,532,639 | Hatch. |

Butler; Ison: Corrosion and its Prevention in Waters, Reinhold, 1966. Chap. 1, p. 2.
Uhlig: Corrosion and Corrosion Control, Wiley, 1965. Chap. 6, p. 79.
LaQue, Copson: Corrosion Resistance of Metals and Alloys, Reinhold, 2nd ed., Chap. 4, p. 83.
Schweitzer, G. W.: Zinc-Glassy Phosphate Inhibitors in Potable Waters, AWWA Annual Conference, Washington, D.C., June 21, 1970.
Hatch, C. B.: Reducing Corrosion in Domestic Systems; Materials Protection; November 1969.

SUMMARY OF THE INVENTION

The invention comprises a process and a composition of matter, each of which is effective in minimizing corrosion, including pitting and tuberculation of the interior surfaces of ferrous and non-ferrous metal, water distribution and plumbing systems. Corrosive waters ranging from aerated soft meteorological to high total dissolved solid supplies and brackish waters are initially treated herein through the introduction of very small but effective quantities of zinc ion and orthophosphate ion inhibitor in concentrated solution, solubilized by pH adjustment, whereby the inhibitor solution, when applied to the water, protects the surface of the corroding interior metal of the piping systems by depositing a film of a composition of zinc and orthophosphate thereover, thus effectively preventing diffusion of dissolved oxygen. Notably, selective diminution in dosage of the inhibitor solution, in the corrosion water sustains the protective zinc and orthophosphate film.

DESCRIPTION OF THE PREFERRED EMBODIMENTS

The basic process and compositions employed in minimizing corrosion on interior surfaces of ferrous and non-ferrous metal, water distribution and plumbing systems are set forth in specific detail, below.

Typical formulation for a stock solution would consist of:

| | Percent |
|---|---|
| $ZnSO_4 \cdot H_2O$ | 63.1 |
| $NaH_2PO_4$ | 27.1 |
| $H_2SO_4$ | 9.8 | dissolved in sufficient water to provide a solids content of 35% or other convenient concentration. In concentrated form the pH must be adjusted to maintain complete solution and avoid precipitation of zinc phosphate. The quantity of acid required will depend on the alkalinity of the water and the selected concentration of the stock solution. The preferred weight ratio of zinc ($Zn^{++}$) to phosphate ($PPO_4^=$) is 1, but the formulation can be varied as required for specific waters. Modifications of the zinc ion and phosphate ion containing stock solution are as follows:

(a)

| | Percent |
|---|---|
| $ZnSO_4 \cdot H_2O$ | 53.8 |
| $NaH_2PO_4$ | 23.1 |
| $NaHSO_4$ | 23.1 |

(b)

| | Percent |
|---|---|
| $ZnSO_4 \cdot H_2O$ | 56.0 |
| $NaH_2PO_4$ | 24.0 |
| $NH_2SO_3H$ | 20.0 |

It is preferred in the water treatment process that the pH of the water be maintained at between 5 and 9 by adding acid or alkali as required. The pH of the inhibitor composition additive, on the other hand, is similarly controlled to insure that the composition as added is soluble. This acidulation can be effected by numerous agents which would include inorganic and/or organic acids which are water soluble and dissociate sufficiently to produce a solubilizing pH. For example, sulfuric, sulfamic, hydrochloric, phosphoric acid and substituted acid salts may be used. Proton donors such as alum can also be employed providing their solubilization will produce the desired pH for solubilizing of the composition additive. Acid salts such as $NaHSO_4$ which provide the necessary solubilizing pH can also be utilized in the formulation.

As indicated, the present formulation when added to water develops the zinc, and orthophosphate ions. Suitable sources for the zinc include zinc chloride, zinc oxide, zinc sulfate, metallic zinc, zinc carbonate, zinc acetate, sodium zincate and/or zinc phosphate. Zinc sulfate comprises the preferred source, but as indicated when the source comprises a buffering salt such as zinc acetate, an extra acid is required to solubilize basic components. Suitable sources for the phosphate ion include orthophosphoric acid, or salts of orthophosphoric acid, as well as the polyphosphates derived from acids and salts of molecularly dehydrated orthophosphates.

In practice, the dosage of the inhibitor to a corrosive water should preferably be maintained initially at a zinc concentration of 2 to 5 times that which is required to sustain protection under subsequent maintenance. This initial induction dosage should be maintained until when sampled at some remote point in the distribution system, it approaches and equilibrium value. When it has then been determined that the zinc residual has approached the applied dosage, the treatment rate should be reduced to a continuous zinc dosage of substantially less than required for initial passivation. This may, for example, imply a dosage of less than one part per million. The type of water, temperate and metals of construction are, of course, variables to consider prior to selecting the preferred zinc concentration.

Metals are protected by present thinly deposited films which, being essentially insoluble in water, restrict the corrosive effects of the gases: dissolved oxygen and carbon dioxide. These films attach so firmly to materials that they cannot be easily washed or rubbed off. Thus, once a freshly installed metal is exposed to water treated with the inhibitor, it can be anticipated that the surface of the metal will be protected and the process of normal metallic corrosion will be prevented. Once a piping system has become fully protected, as is evidenced by the presence of the zinc at the extremities of the distribution system or termination of the metallic plumbing, the initial "precoat" dosage of inhibitor may be dropped to some low value so as to just maintain the desposited film and to protect against mechanical damage. Experiments were conducted with the following results:

An inhibitor stock solution was prepared using 63.1% zinc sulfate monohydrate, 27.1% sodium dihydrogen phosphate, 9.8% concentrated sulfuric acid and sufficient water to provide a total solution of one gallon. The inhibitor was tested at a southeastern Virginia municipal water system where the water analysis is as follows:

| | P.p.m. |
|---|---|
| Total dissolved solids | 62 |
| Total alkalinity | 12 |
| Calcium hardness | 30 |
| Total hardness | 36 |
| pH—5.9. | |
| Chlorides | 16 |
| Sulfate | 16 |
| Phosphates | 0 |

Standard 1010 steel coupons were positioned in a stream of untreated water to serve as controls while other coupons were exposed to the inhibitor. The inhibitor feed rate was controlled for 72 hours at a rate that produced an effluent stream containing 3 p.p.m. of zinc. After this induction period, the inhibitor feed rate was reduced to control the zinc at 1 p.p.m. The coupons were removed after 30 days and the controls exhibited a corrosion rate of 8.82 mils/year and the treated coupons only 0.49 mil/year. The corrosion reduction due to this inhibitor was 94.4%.

The formulation consisting of 56% zinc sulfate monohydrate, 24% mono-basic phosphate and 20% sulfamic acid was used to prepare a stock solution for corrosion studies with this same municipal water supply. Four sets of conditions were explored after a 70-hour induction of 1010 steel with the zinc level at 3 p.p.m. The tests were continued at 1 p.p.m., 0.75 p.p.m. and 0.5 p.p.m. of zinc. After 30 days, the control coupons were corroding at a rate of 8.77 mils/year, while the corrosion rate at 1 p.p.m. of zinc was 1.20 mils/year, 1.22 mils/year at 0.75 p.p.m. of zinc and 1.30 mils/year at 0.5 p.p.m. of zinc. The corrosion reduction in all three tests ranged from 85.5 to 86.2%.

This same formulation with sulfamic acid was tested with 1010 steel and Portsmouth, Va., city water softened to zero hardness. The corrosion rate, after pretreatment with 3 p.p.m. of zinc for 2 days, then 1 p.p.m. of zinc for 28 days, was 0.48 mil/year. The same test without pretreatment but 1 p.p.m. of zinc for 30 days yielded a corrosion rate of 1.07 mils/year. The corrosion reduction was 96.6%; without pretreatment, the reduction was 92.3%. The water analyses:

| | P.p.m. |
|---|---|
| Hardness | 0 |
| Chlorides | 19 |
| pH—8.1. | |
| Total alkalinity | 80 |
| Total dissolved solids | 145 |

A dilute feed solution was prepared with zinc sulfate monohydrate and mono-basic phosphate and because of the high dilution and the low pH of the water, 5.0, a solubilizing acid was not required. 1010 steel coupons were treated in this system with 1 p.p.m. of zinc, without pretreatment, for a period of 30 days and the final corrosion rate was 0.56 mil/year and the reduction in corrosion was 83.8%.

In all of the above examples, the ratio of zinc to phosphate is approximately one. Conditions of the first example above, where the corrosion reduction of 1010 steel was 94.4%, were repeated in two tests where the ratio of zinc to phosphate was 2 and in the second test, 0.5. At the higher zinc level, the corrosion reduction was about 63% and at the higher phosphate level, the reduction was 72%. In this water system, the preferred ratio of zinc to phosphate is about one, although not limiting.

Tests conducted in various areas of the country also demonstrate the effectiveness of this zinc-orthophosphate inhibitor. Corrosion reductions ranging from 77% to 94% have been realized with 1010 steel in the waters of many geographical areas.

We claim:

1. In the conduct of water through a piping system, a method of inhibiting the corrosion of ferrous and nonferrous conductors thereof, comprising the steps of:
   (A) initially treating the water with a small but effective dosage consisting essentially of zinc ion-phosphate ion in weight ratios of substantially 1 zinc ($Zn^{++}$) to 1 phosphate ($PO_4^{\equiv}$);
   (B) simultaneously controlling the pH of the water within the range of 5–9; and
   (C) sequentially passing the treated water into continuous contact with the conductors to coat conductive surfaces thereof by depositing a protective film thereon.

2. The method of claim 1 wherein the weight ratio of zinc ion within the water does not exceed five parts per million.

3. The method according to claim 1 wherein as the precoating is effected and zinc residual approaches applied dosage, a sequential and continuous reduction in the dosage is effected, said reduction in dosage not exceeding the amount required to sustain the protective film.

4. The method according to claim 3, wherein the weight ratio of inhibitor to water in the initial treatment is within the range of 1 p.p.m.–5 p.p.m. of zinc ions.

5. The method according to claim 3 wherein as the precoating is effected and zinc residual approaches applied dosage, a sequential and continuous reduction in the dosage is effected, said reduction in dosage not exceeding the amount required to sustain the deposition of zinc phosphate film.

6. A composition corrosion inhibitor for ferrous and non-ferrous water conduits consisting essentially of two solids in admixture, said respective solids in aqueous solution comprising a weight ratio of zinc ions to phosphate ions of 1 zinc ($Zn^{++}$) to 1 phosphate ($PO_4^{\equiv}$) said zinc ions and phosphate ions having film-forming properties, relative to the water conduit.

7. The composition of matter of claim 6 wherein the zinc ions are provided by zinc chloride in the mixture solution.

8. The composition of matter of claim 6 wherein the zinc ions are provided by zinc oxide in the mixture solution.

9. The composition of matter of claim 6 in which the zinc ions are provided by zinc carbonate in the mixture solution.

10. The composition of matter of claim 6 in which the zinc ions are provided by sodium zincate in the mixture solution.

11. The composition of matter of claim 6 in which the zinc is provided by zinc sulfate and in which the phosphate is provided by sodium dihydrogenphosphate, each within the mixture solution.

12. The composition of matter of claim 6 wherein the zinc ions are provided by a zinc salt and the phosphate ions are provided by orthophosphoric acid, each in the mixture solution.

13. The composition of matter of claim 6 wherein the zinc ions are provided by a zinc salt and the phosphate ions are provided by salts of orthophosphoric acid, each in the mixture solution.

14. The composition corrosion inhibitor of claim 6 wherein the respective solids comprise zinc sulfate and alkali orthophosphate.

15. A composition of matter according to claim 14 wherein the composition comprises an aqueous mixture solution, the pH of which is sustained sufficiently low by an acid addition to sustain solubility of solids.

References Cited

UNITED STATES PATENTS

| Number | Date | Name | Class |
|---|---|---|---|
| 2,316,810 | 4/1943 | Romig | 148—6 |
| 2,332,209 | 10/1943 | Enquist | 252—387 |
| 2,742,369 | 4/1956 | Hatch | 106—14 |
| 2,877,085 | 3/1959 | George et al. | 21—2.7 |
| 2,900,222 | 8/1959 | Kahler et al. | 21—2.7 |
| 3,024,201 | 3/1962 | Bregman | 252—387 |
| 3,116,105 | 12/1963 | Kerst | 21—2.7 |
| 3,151,087 | 9/1964 | Ryznar et al. | 252—387 |
| 3,510,436 | 5/1970 | Silverstein et al. | 252—389 |

OTHER REFERENCES

Evans, U. R., The Corrosion and Oxidation of Metals, first supplementary vol. (1968), pp. 76, 77 [TA/462/E8c].

MORRIS O. WOLK, Primary Examiner

D. G. MILLMAN, Assistant Examiner

U.S. Cl. X.R.

252—387